United States Patent [19]

Okamoto et al.

[11] Patent Number: 4,758,902

[45] Date of Patent: Jul. 19, 1988

[54] PCM SIGNAL RECORDING AND REPRODUCING APPARATUS INCLUDING SIMULTANEOUS ERROR DETECTION/CORRECTION

[75] Inventors: Hiroo Okamoto, Yokohama; Hiroyuki Kimura, Kanagawa; Shigeru Yamazaki, Yokohama; Takaharu Noguchi, Yokohama; Masaharu Kobayashi, Yokohama, all of Japan

[73] Assignee: Hitachi, Ltd., Tokyo, Japan

[21] Appl. No.: 886,235

[22] Filed: Jul. 16, 1986

[30] Foreign Application Priority Data

Jul. 19, 1985 [JP] Japan ............................... 60-158124

[51] Int. Cl.[4] .......................... G11B 5/09; G11B 5/86; G11B 20/18

[52] U.S. Cl. ........................................ 360/18; 360/53; 360/32; 360/15; 371/38

[58] Field of Search ................... 360/8, 15, 31, 18, 53, 360/32; 371/38

[56] References Cited

U.S. PATENT DOCUMENTS 4,238,852 12/1980 Iga et al. ............................... 360/53
4,477,844 10/1984 Nakano et al. ......................... 360/8

FOREIGN PATENT DOCUMENTS 0092403 10/1983 European Pat. Off. .
0115200 8/1984 European Pat. Off. .
0115699 8/1984 European Pat. Off. .
0128577 12/1984 European Pat. Off. .
58-143410 8/1983 Japan .
59-16111 1/1984 Japan .
60-15826 1/1985 Japan .

*Primary Examiner*—Raymond F. Cardillo
*Assistant Examiner*—Kevin J. Fournier
*Attorney, Agent, or Firm*—Antonelli, Terry & Wands

[57] ABSTRACT

A PCM signal recording and reproducing apparatus comprises first and second memory circuits, in which PCM signals are read and written using the first memory circuit, while PCM signals stored in the second memory circuit are error-corrected. At the end of writing by the first memory circuit, the first and second memory circuits are interchanged to read the error-corrected PCM signals stored in the second memory circuit. The read-out error-corrected PCM signals are then recorded on another magnetic tape.

5 Claims, 8 Drawing Sheets

1 3b 3 3a 3c 2 4a 4 4a 4b 5 6 7 15 16 18 19 20
DEMODULATION
SYNC DETECTION
CONTROL SIGNAL DETECTION
SYNC SIGNAL GENERATION
MODULATION
17 WRITE ADDRESS GENERATION
READ ADDRESS GENERATION 21
22 MPX 23
8
RAM - A 10
RAM - B 11
9
12 ERROR DETECTION CORRECTION
CORRECTION ADDRESS GENERATION
TIMING CONTROL 13
24 25

1
2
3
3a
3b
3c
4
4a
4b
5
6
7
DEMODULATION
15
SYNC DETECTION
16
CONTROL SIGNAL DETECTION
18
SYNC SIGNAL GENERATION
19
MODULATION
20
WRITE ADDRESS GENERATION
17
READ ADDRESS GENERATION
21
22
MPX
23
8
RAM - A
10
RAM - B
11
9
12
ERROR DETECTION CORRECTION
24
CORRECTION ADDRESS GENERATION
25
TIMING CONTROL
13

360°
REPRODUCING
RECORDING
RAM SWITCHING
WRITE / READ
CORRECTION
B WRITE
A READ
A WRITE
B READ
B WRITE
A READ
A WRITE
B READ
A CORRECTION
B CORRECTION
A CORRECTION
B CORRECTION
A CORRECTION
a
b
c
d

360°
REPRODUCING
RECORDING
RAM SWITCHING
READ/WRITE
CORRECTION
D/A OUTPUT
A-1 READ
A-1 WRITE
B-1 READ
B-1 WRITE
A-2 READ
A-2 READ
B-2 READ
B-2 WRITE
A-1 READ
B-2 CORRECTION
A-1 CORRECTION
A-2 CORRECTION
B-1 CORRECTION
A-2 CORRECTION
B-2 CORRECTION
B-1 OUTPUT
A-2 OUTPUT
A-2 OUTPUT
B-2 OUTPUT
A-1 OUTPUT
B-1 OUTPUT
e
f
g
h
i

4 SLOTS
28 SLOTS
MPX SWITCHING
ERROR CORRECTION
D/A OUTPUT

PCM SIGNAL RECORDING AND REPRODUCING APPARATUS INCLUDING SIMULTANEOUS ERROR DETECTION/CORRECTION

BACKGROUND OF THE INVENTION

The present invention relates to PCM signal recording and reproduction, and more particularly to a PCM signal recording and reproducing apparatus suitable for copying PCM signals.

Of PCM signal recording and reproducing apparatus, there is disclosed in JP-A-59-16111 laid-open No. on Jan. 27, 1984 (Japanese Patent Application No. 57-125565 filed on July 19, 1982) a rotary head type PCM recorder which records PCM signals on a magnetic tape using a rotary head. In the case where a rotary head type PCM recorder having a plurality of rotary heads, for example, two rotary heads, is used, the two heads are mounted on a rotary member each angularly spaced apart by $360°/2=180°$. A magnetic tape is slantwise wound about the periphery of the rotary member over an angular range less than 180 degrees, for example, 90 degrees. The rotary member is then rotated while the magnetic tape is run in one direction. Then, PCM signals are recorded one track after another on the magnetic tape in the direction slanted relative to the longitudinal direction thereof alternately using the two heads, or PCM signals already recorded on the magnetic tape are reproduced using the two heads.

PCM recorders of this type are advantageous in that high fidelity audio signals can be recorded and reproduced and that signal quality is not degraded even after plural copies. However, the conventional PCM recorders record or reproduce PCM signals using only one magnetic tape, as in the case of the JP-A-59-16111. Therefore, two PCM recorders have been required for copying recorded PCM signals; one for reproducing PCM signals recorded on a magnetic tape, and the other for recording the reproduced PCM signals on another magnetic tape. Further, a high speed copying such as a double speed copying has not been considered.

FIG. 2 shows an example of a record pattern on a magnetic tape recorded by a conventional single PCM recorder of a rotary head type. Reference numeral 1 generally represents a magnetic tape, and reference numeral 30 represents one block. One track is constructed of a plurality of blocks, for example, 128 blocks, including synchronizing signals 31, control signals 32 such as signals associated with PCM signals and a block number, and PCM signals and error correcting code 33 (the latter is used for correcting errors and called parity hereinafter). The format of one block data is disclosed in the JP-A-59-16111.

FIG. 3 is a timing chart for reproducing PCM signals recorded as in FIG. 2. With rotary head type PCM recorders as disclosed in JP-A-59-16111, PCM signals of two tracks are reproduced every time the two rotary heads rotate once as previously discussed. A PCM signal reproduced is temporarily stored in a memory circuit, such as a RAM and thereafter, subjected to error correction and converted into an analog signal to output it. In order to copy the reproduced PCM signal, the PCM signal after error correction is once stored in another memory circuit similar to the above-described RAM where a parity (error correcting code) shown by numeral 33 in FIG. 2 is added. Thereafter, the PCM signal with a parity is applied to a modulating circuit and recorded on another magnetic tape using other rotary heads. Consequently, there arises a problem that the conventional apparatus become expensive. Further, in case of a high speed copying, reproduction, error correction and recording must be carried out at high speed so that signal processing circuits and recording circuits must be accessed at high speed. For instance, in case of a double speed copying, the time required for reproducing and error-correcting PCM signals becomes half, respectively. Moreover, a time for recording is needed so that memory circuits and signal processing circuits must be operated at a double speed or higher. Particularly, in case of error correction, it is necessary to input data from a memory circuit to an error correcting circuit and write the corrected data in another memory circuit, thus causing a number of accesses to RAMs and therefore leaving only a short time for error correction.

SUMMARY OF THE INVENTION

An object of the present invention is to provide a PCM signal recording and reproducing apparatus capable of copying PCM signals, which is relatively inexpensive.

According to one feature of the present invention, two memory circuits (RAMs) are used. While PCM signals are read and written using one of the two memory circuits, PCM signals stored in the other memory circuit are error-corrected. At the end of writing with respect to the former memory circuit, the two memory circuits are interchanged to read the error-corrected PCM signals stored in the latter memory circuit. The read-out error-corrected PCM signals are then recorded on another magnetic tape, thus dispensing with a parity adding circuit necessary for recording, and realizing inexpensive copying. Further, a high speed copying is possible without incorporating a high speed access to memory circuits.

DESCRIPTION OF THE PREFERRED EMBODIMENTS

First, an embodiment of the present invention will be described with reference to FIG. 1.

Figure 1:
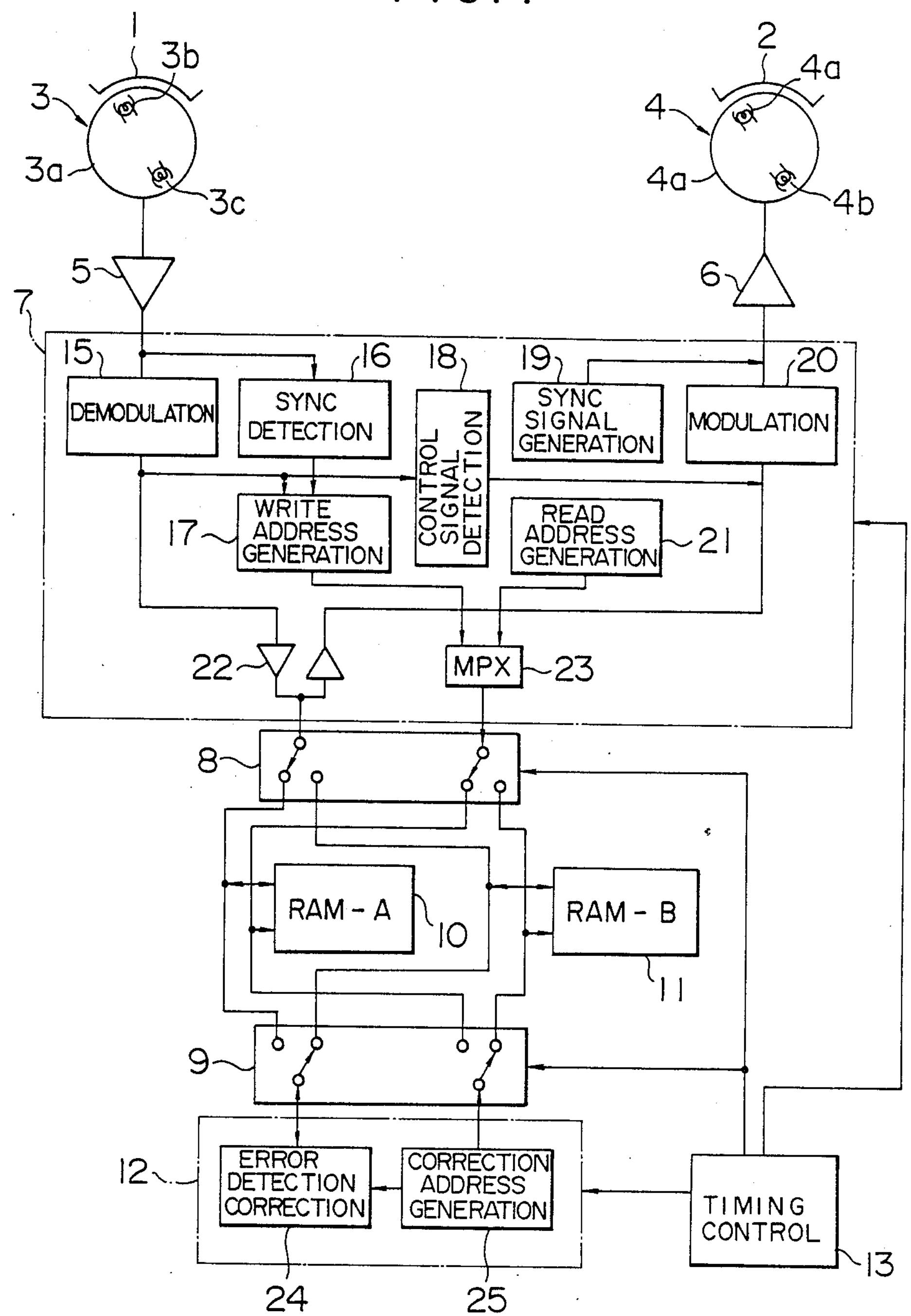
FIG. 1 is a circuit diagram of the PCM signal recording and reproducing apparatus according to an embodiment of the present invention.
Figure 2:
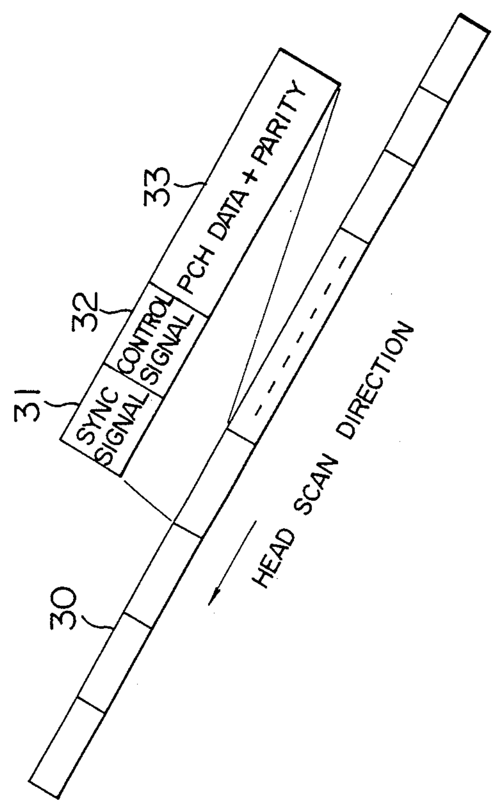
FIG. 2 is an example of a record pattern on a magnetic tape.
Figure 3:
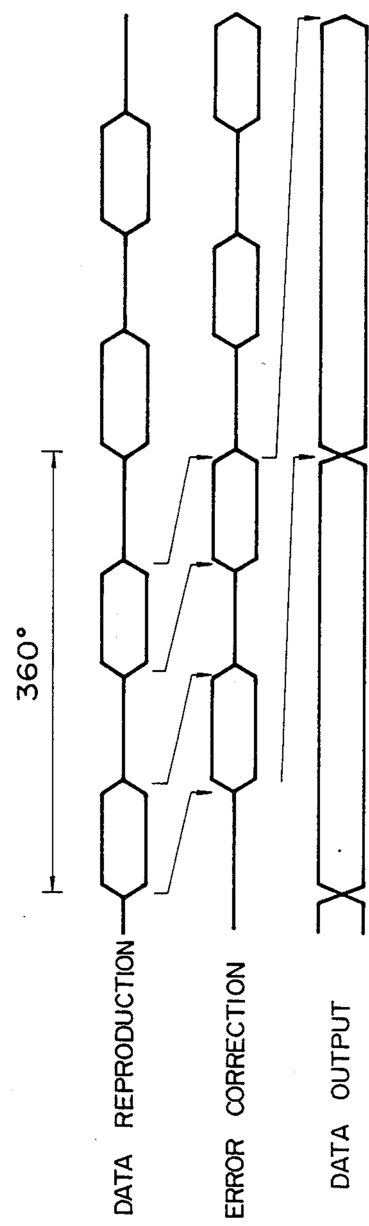
FIG. 3 is a timing chart for reproducing operation according to the prior art.

In the circuit shown in FIG. 1, PCM signals recorded on a first magnetic tape 1 are copied on a second magnetic tape 2. A first rotary head 3 has two magnetic heads 3*b* and 3*c* mounted on the periphery of a rotary member 3*a*, the heads being angularly spaced apart by 180 degrees. The magnetic tape 1 is slantwise wound about the periphery of the rotary member 3*a* over the angular range of 90 degrees, and disposed so as to alternately contact the two magnetic heads 3*b*, and 3*c*. Similarly to the first rotary head 3, a second rotary head 4 has two magnetic heads 4*b* and 4*c* mounted on the periphery of a rotary member 4*a*, the heads being angularly spaced apart by 180 degrees. The magnetic tape 2 is slantwise wound about the periphery of the rotary member 4*a* over the angular range of 90 degrees, and disposed so as to alternately contact the two magnetic heads 4*b* and 4*c*. Other circuit elements include a reproducing amplifier 5, a recording amplifier 6, a recording-/reproducing circuit 7, switching circuits 8 and 9, RAMs 10 and 11, an error correcting circuit 12, and a timing control circuit 13.

In the operation of reproducing, a signal reproduced, by the first rotary head 3 from the first magnetic tape 1 is amplified, waveform-equalized and converted into a digital signal by the reproducing amplifier 5. The digital signal is then inputted to a demodulation circuit 15 and a synchronizing signal detection circuit 16. The demodulation circuit 15 demodulates a PCM signal and a parity from the reproduced signal outputted by the reproducing amplifier 5. The synchronizing signal detection circuit 16 detects synchronizing signals in the reproduced signal. A write address generation circuit 16 generates an address indicative of the area of RAM 10 or RAM 11 where the PCM signal and the parity are written, based on the synchronizing signals detected by the synchronizing signal detection circuit 16 and the block number in the control signals demodulated by the demodulation circuit 15 which also demodulated the PCM signal. The PCM signal and the parity demodulated by the demodulation circuit 15 are written in a first memory circuit or RAM 10 or a second memory circuit or RAM 11 in accordance with the generated address. The control signals in the reproduced signal are detected by the control signal detection circuit 18 and temporarily stored in this circuit.

In the operation of recording, a modulation circuit 20 modulates the PCM signal and the parity read from either RAM 10 or RAM 11 in accordance with an address generated by a read address generating circuit 21, and modulates also the control signals stored in the control signal detecting circuit 18. These modulated signals, together with the synchronizing signals generated by the synchronizing signal generating circuit 19, are recorded on the second magnetic tape 2 using the second rotary head 4. A buffer 22 is used in switching input and output operations with respect to RAMs 10 and 11, and a multiplexer 23 is for switching addresses of RAMs 10 and 11.

In the operation of error correction, the PCM signal and the parity, which are read from RAM 10 or RAM 11 in accordance with an address generated by an error correction address generating circuit 25, are inputted via a switching circuit 9 to an error correcting circuit 24 to perform error correction. The error-corrected PCM signal and parity are again written in RAM 10 or RAM 11 for completing error correction. The timing control circuit 13 is for controlling switching timings of the switching circuits 8 and 9, i.e., switching timings of recording, reproducing, error-correcting, and RAMs 10 and 11.

In the operation of copying PCM signals recorded on the magnetic tape 1 to the magnetic tape 2, a signal reproduced from the magnetic tape 1 is stored in RAM 10 or RAM 11 and thereafter error-corrected. Then, the corrected signal is again read from RAM 10 or RAM 11 to record it on the magnetic tape 2. In this case, by alternately using RAMs 10 and 11 between read/write and error-correction, and access speed to RAMs and associated circuits will be lowered. Further, since there is provided only one set of the recording/reproducing circuit and the error correcting circuit, the scale of circuits will not become large. In particular, parities corrected during error correction are retained so that copying can be performed after error correction using the retained parities without newly generating parities.

Figure 4:
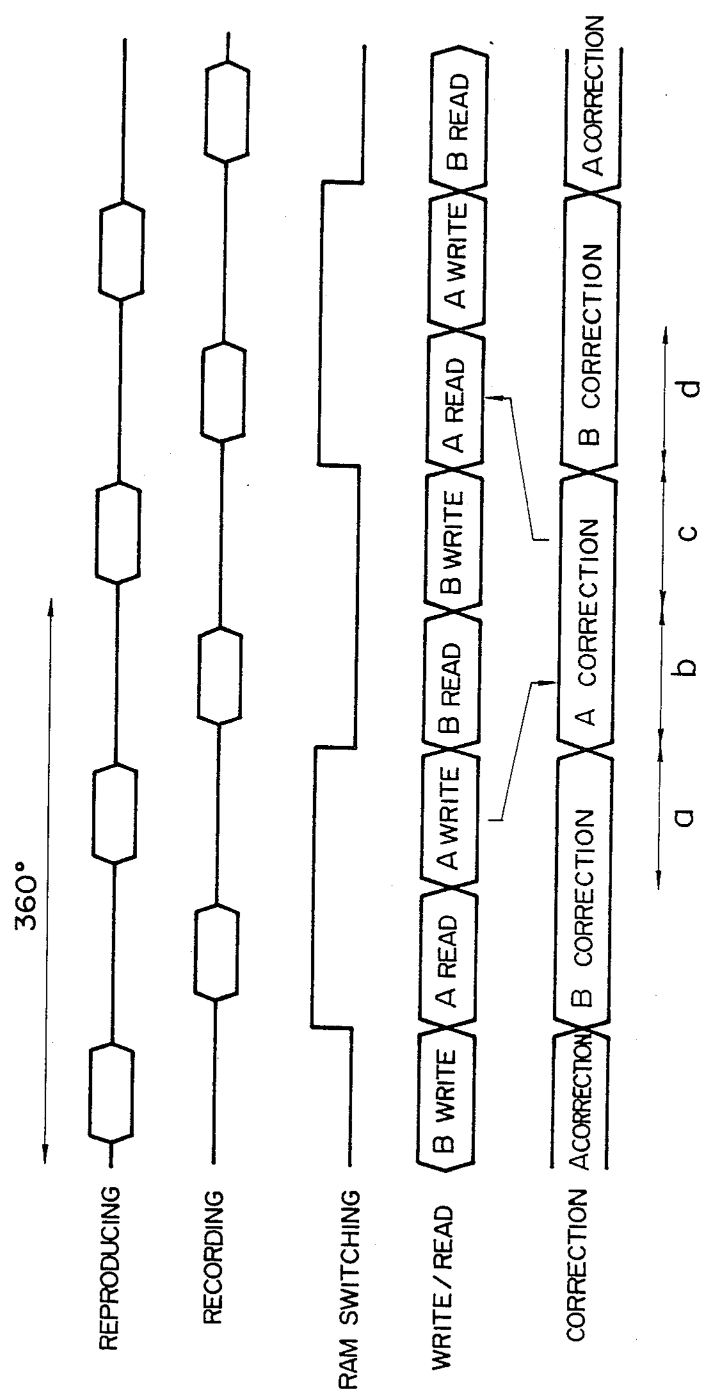
FIG. 4 is a timing chart for the circuit of FIG. 1.

The operation timings of RAMs and associated circuits will now be described with reference to FIG. 4.

As described previously, PCM signals of two tracks are reproduced every time the rotary head rotates once (360 degrees). Since the wound-angle of the magnetic tape about the rotary head is 90 degrees, PCM signals of one track are reproduced by one fourth (90 degrees) of a single revolution. The switching circuits 8 and 9 are for switching data input/output and addresses with respect to RAMs 10 and 11, at the timings in units of 180 degrees, and are controlled by the timing control circuit 13. The timing control circuit 13 itself is known as disclosed in the JP-A-59-16111. For instance, clocks from a clock generator are supplied to an address counter whose output is supplied to a ROM. The output from the ROM reverses its state at 30 Hz between the 180 degree rotating period of the rotary head 3 and that of the rotary head 4. In this embodiment, such a reversing signal is used as a RAM switching signal. In response to the RAM switching signal, if one of the switching circuits 8 and 9 selects RAM 10, then the other of the switching circuits 8 and 9 selects RAM 11.

Assume that the switching circuit 8 is selecting RAM 10 during which one track data is reproduced from the magnetic tape 1 at timing a. The reproduced PCM signal and parity are written in RAM 10. After the reproduced signal is written, the switching circuits 8 and 9 are interchanged. That is, the switching circuit 9 selects this time RAM 10 so that at timings b and c the PCM signal written at timing a is error-corrected using the parity. At this period, the switching circuit 8 is selecting RAM 11 so that at timing b the error-corrected PCM signal and parity stored in RAM 11 are read and recorded on the magnetic tape 2 through the modulation circuit 20. At timing c, the PCM signal and parity reproduced from the magnetic tape 1 are written in RAM 11. At timing d, the switching circuits 8 and 9 are again interchanged and the switching circuit 8 selects RAM 10. Then, the error-corrected PCM signal and parity at timings b and c are recorded on the second magnetic tape 2 through the modulation circuit 20. During this period, the switching circuit 9 is selecting RAM 11 and the PCM signal stored in RAM 11 is error-corrected.

As described above, by alternately switching RAM 10 and RAM 11 between recording/reproducing and error correcting, access to each RAM is performed either for recording/reproducing or for error correcting so that copying can be carried out without raising the access speed. Further, a high speed copying is also possible if the access speed is raised. For instance, assuming that the transfer rate of a reproduced signal is 1 MBPS (mega-byte/sec, the same rate is assumed for recording), a double speed copying is possible if the access speed to RAMs is set as twice higher than 2 MHz or more. For error correction, one error correction will suffice during 180 degree rotation. Therefore, an error correction is ensured if an access to RAMs is performed at the same access speed as that of recording/reproducing.

As to the timings for reproducing/recording of PCM signals, the angular phases of the rotary heads 3 and 4 are controlled so that the reproducing and the recording are alternately performed. In particular, although a RAM switching signal is obtained from the ROM of the timing control circuit 13 as described before, a recording servo reference signal and a reproducing servo reference signal are also intended to be obtained from the ROM in this embodiment. Therefore, a minor change of the content of the ROM enables obtaining these reference signals for alternately using the rotary heads 3 and 4 for recording/reproducing.

Figure 5:
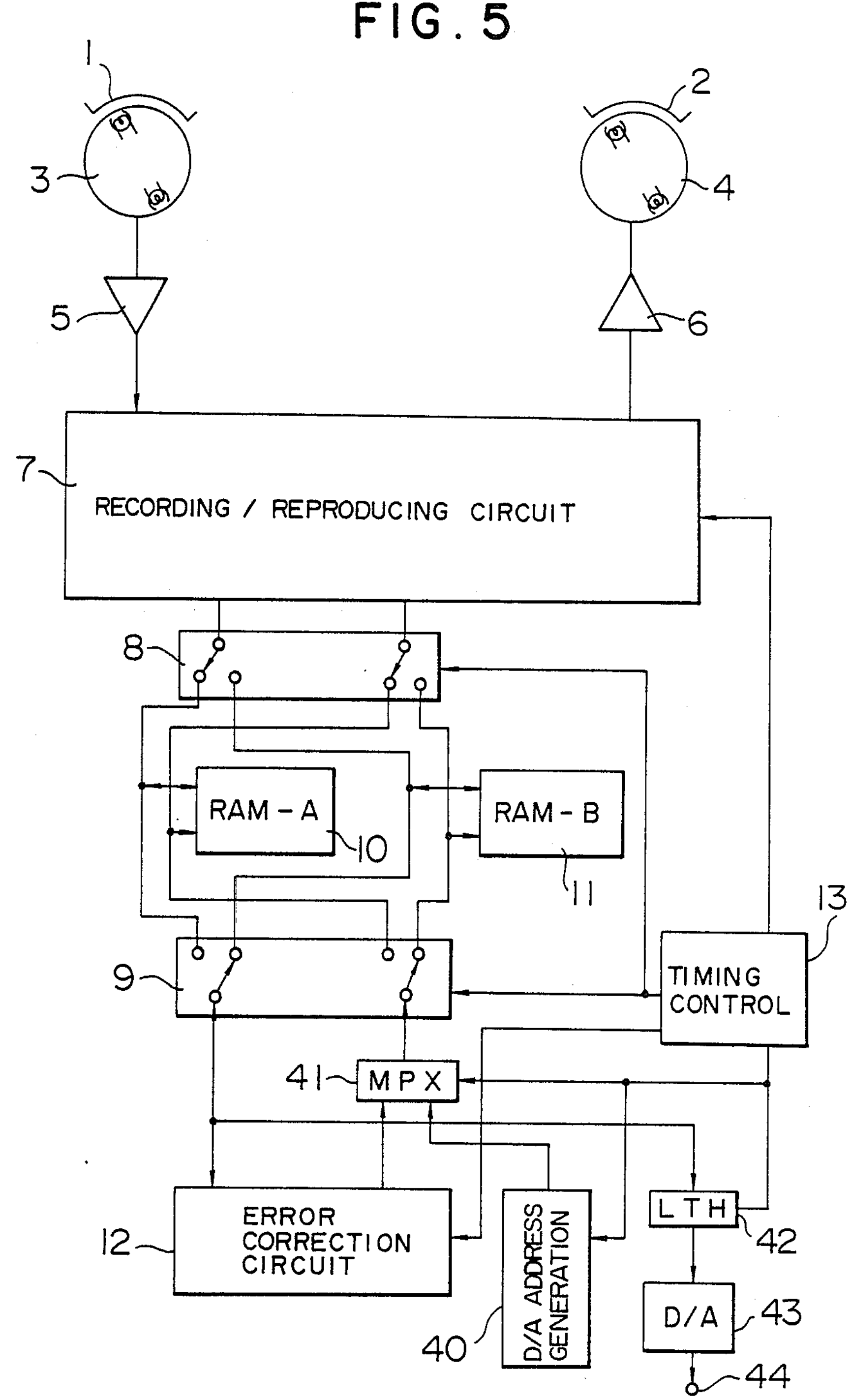
FIG. 5 is a circuit diagram of the PCM signal recording and reproducing apparatus according to another embodiment of the present invention.

Another embodiment of the present invention will be described with reference to FIG. 5. In the circuit shown in FIG. 5, a circuit capable of outputting PCM signals in the form of sounds during a copying operation is added to the PCM signal recording and reproducing apparatus shown in FIG. 1.

Additional elements include a D/A address generating circuit 40, a multiplexer 41, a latch circuit 42, and a D/A converter 43. The capacity of RAM 10 and RAM 11 of FIG. 1 suffices if it can store PCM signals and parities corresponding to one track. However, in the circuit of FIG. 5, the capacity of RAM 10 and RAM 11 is such that it can store PCM signals and parities corresponding to two tracks.

Figure 6:
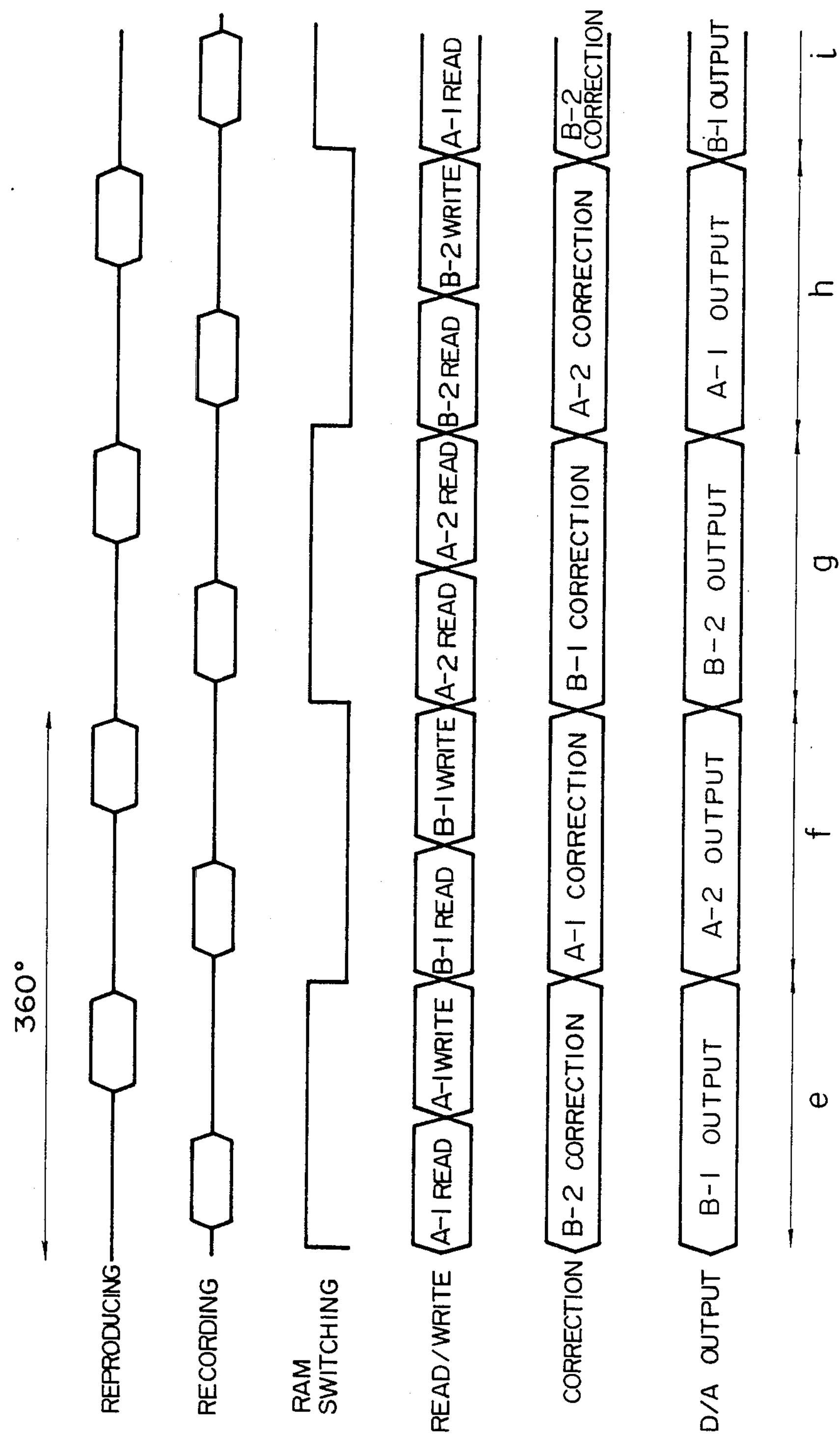
FIG. 6 is a timing chart for the circuit of FIG. 5.

The operation timings of RAMs and associated circuits will be described referring to FIG. 6. The timings of recording/reproducing and error correcting are the same as in the case of FIG. 4, however, in this embodiment the memory area of the RAM 10 and RAM 11 is divided into two areas to be alternately used. For instance, if read and write operations are performed for a first area of RAM 10 at timing e, then at timing g read and write operations are carried out for a second area of RAM 10. Error correction is carried out immediately after a write operation to the RAM 10. In particular, the PCM signal and parity written in the first area of RAM 10 at timing e are error-corrected at timing f. Thereafter, at a succeeding timing i the corrected PCM signal and parity are read and recorded.

The output of PCM signals to the D/A converter 43 is effected from RAM selected by the switching circuit 9, i.e., from the same RAM associated with error correction. While error correction is carried out for the first area of RAM, the PCM signal stored in the second area of the same RAM is outputted to the D/A converter 43. Alternatively, while error correction is carried out for the second area, the PCM signal stored in the first area is outputted to the D/A converter 43. As a result, the PCM signal written at timing e for example, is error-corrected at timing f and thereafter, outputted to the D/A converter 43 at timing h and read and recorded at timing i. As such, the error-corrected PCM signal can be outputted to the D/A converter 43 prior to reading-out thereof so that the PCM signal can be outputted in the form of sound signal.

Figure 7:
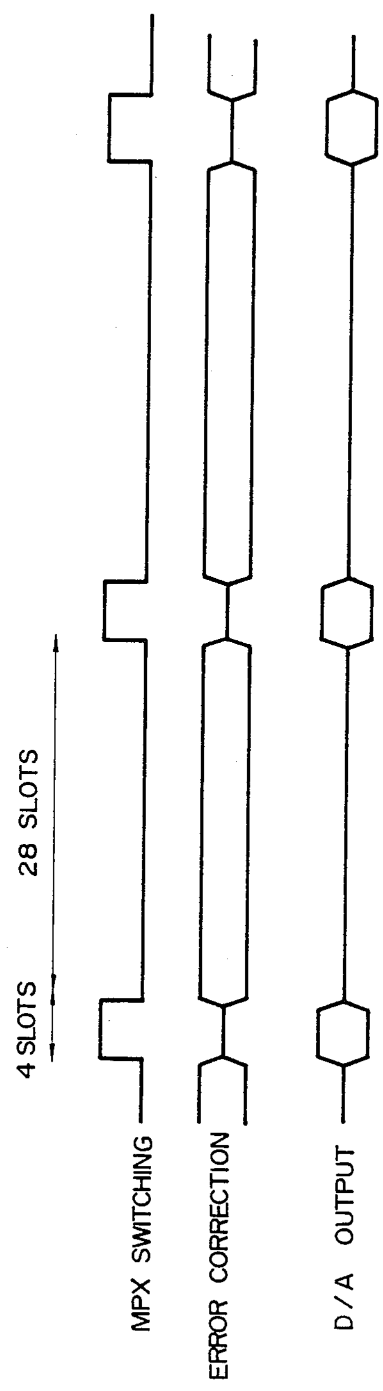
FIG. 7 is a timing chart for D/A converter output.

FIG. 7 shows the output timing of PCM signals to the D/A converter 43. PCM signals can be outputted during the period between error corrections because the sampling frequency of PCM signals is in the order of 48 KHz. It is assumed here that the PCM signal is a two-channel signal of a sampling frequency 48 KHz and that the RAM access speed is 3.072 MHz (48 k×64). Then, the output timing of PCM signals to the D/A converter 43 may be once per 32 slots of RAM access. For instance, during 4 slots among 32 slots PCM signals are outputted to the D/A converter 43, while on the other hand, the input/output operation with respect to the error correcting circuit 12 is carried out during the remaining 28 slots. During 4 slots for outputting PCM signals to the D/A converter 43, the multiplexer 41 selects the D/A address generating circuit 40 to input an address of PCM signals, to be outputted to the D/A converter 43, to RAM 10 or RAM 11. During the remaining 28 slots, the multiplexer 41 selects the error correcting circuit 12 to input PCM signals and parities thereto or output them therefrom. The PCM signal read from RAM 10 or RAM 11 in accordance with an address generated from the D/A address generating circuit 40 is latched by the latch circuit 42 and thereafter, inputted to the D/A converter 43 and converted into an analog signal which in turn is outputted from an output terminal 44.

As above, PCM signals can be outputted in the from of sound during a copying operation. Obviously, PCM signals can be outputted in the form of sound during a high-speed copying.

Figure 8:
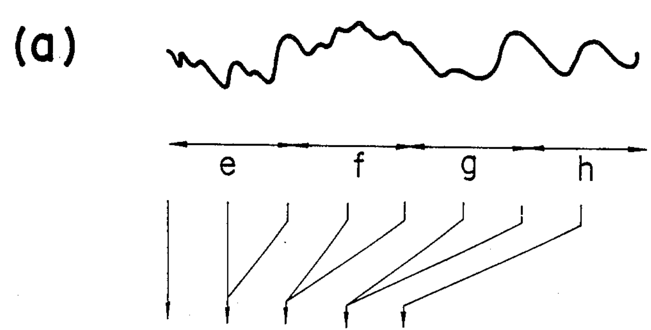
FIGS. 8A and 8B are waveforms of analog signals during a double-speed copying.
Figure 8:
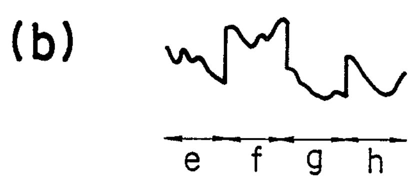

FIGS. 8A and 8B show waveforms of output sounds during a double-speed copying. FIG. 8A shows a waveform of a PCM signal outputted from the D/A converter 43 at timings e to h. In order to obtain an analog signal corresponding to the PCM signal, it is necessary to double the conversion period of the D/A converter 43, resulting in an indistinct sound having a frequency twice as high as in an ordinary speed copying. In view of this, the front halves of the PCM signal at respective timings are sampled as shown in FIG. 8B to obtain a new PCM signal which in turn is converted into an analog signal at the same conversion period as in the ordinary reproduction. With this analog signal, sounds during a double-speed copying can be outputted without raising the sound frequency.

It is necessary to add a flag to a PCM signal, during error correction and sound outputting, for indicating that error correction is being carried out or error is incorrectable. To this end, the flag may be stored in a specific area provided in RAM 10 or RAM 11, or in a memory circuit provided in the error correcting circuit 12.

We claim:

1. A PCM signal recording and reproducing apparatus for recording a PCM signal and an error correction code added to the PCM signal on a magnetic tape and reproducing the PCM signal and the error correction code using a rotary head, comprising:

first and second rotary heads;

first and second magnetic tapes;

a reproducing circuit for reproducing a PCM signal and an error correction code both recorded on said first magnetic tape using said first rotary head;

a recording circuit for recording said PCM signal and said error correction code on said second magnetic tape using said secondary rotary head;

an error correction circuit for error-correcting said PCM signal using said error correction code;

first and second memory circuits;

a first control circuit for enabling reading said PCM signal and said error correction code stored in said first memory circuit and outputting them to said recording circuit by selecting said first memory circuit, and after reading and outputting said PCM signal and said error correction code, enabling writing a following PCM signal and a following error correction code both reproduced by said reproducing circuit; and a second control circuit for enabling applying another PCM signal and another error correction code already stored in said second memory circuit to said error correcting circuit by selecting said second memory circuit during the time while said first control circuit selects said first memory circuit, and enabling error correction of said other PCM signal referring to said other error correction code.

2. A PCM signal recording and reproducing apparatus according to claim 1, wherein said first control circuit enables reading said corrected PCM signal and said corrected error correction code both stored in said second memory circuit and outputting them to said recording circuit by selecting said second memory circuit after said following PCM signal and said following error correction code are written in said first memory circuit, and after reading and outputting said corrected PCM signal and said corrected error correction code, enables writing another following PCM code and another following error correction code reproduced by said reproducing circuit, and during such operation of said first control circuit, said second control circuit enables coupling said following PCM signal and said following error correction code already stored in said first memory circuit to said error correcting circuit by selecting said first memory circuit and enables error-correcting said following PCM signal by referring to said following error correction code.

3. A PCM signal recording and reproducing apparatus according to claim 1, wherein each of said first and second rotary heads has a plurality of magnetic heads mounted on a rotary member, each magnetic head being angularly spaced apart by a same angle, and each of said first and second magnetic tapes is slantwise wound about the periphery of said rotary member over an angular range smaller than said same angle and can alternately contact said plurality of magnetic heads.

4. A PCM signal recording and reproducing apparatus according to claim 3, wherein said plurality of magnetic heads are two magnetic heads mounted on said rotary member and substantially spaced apart by 180 degrees, and each of said magnetic tapes is slantwise wound about the periphery of said rotary member substantially over an angular range of 90 degrees and can alternately contact said two magnetic heads.

5. A PCM signal recording and reproducing apparatus according to claim 1, wherein each of said rotary heads has two magnetic heads mounted on a rotary member and substantially spaced apart by 180 degrees, and each of said magnetic tapes is slantwise wound about the periphery of said rotary member substantially over an angular range of 90 degrees and can alternately contact said two magnetic heads, and wherein said first control circuit enables reading said corrected PCM signal and said corrected error correction code both stored in said second memory circuit and outputting them to said recording circuit by selecting said second memory circuit after said following PCM signal and said following error correction code are written in said first memory circuit, and after reading and outputting said corrected PCM signal and said corrected error correction code, enables writing another following PCM code and another following reproduced by said reproducing circuit, and during such operation of said first control circuit, said second control circuit enables coupling said following PCM signal and said following error correction code already stored in said first memory circuit to said error correcting circuit by selecting said first memory circuit and enables error-correcting said following PCM signal by referring to said following error correction code.

* * * * *